(No Model.) 3 Sheets—Sheet 1.

J. H. BENNETT.
SNOW PLOW.

No. 354,675. Patented Dec. 21, 1886.

Witnesses
T. W. Fowler
H. B. Applewhaite

Inventor
John H. Bennett
By his Attorneys,
A. H. Evans & Co.

(No Model.) 3 Sheets—Sheet 2.
J. H. BENNETT.
SNOW PLOW.
No. 354,675. Patented Dec. 21, 1886.
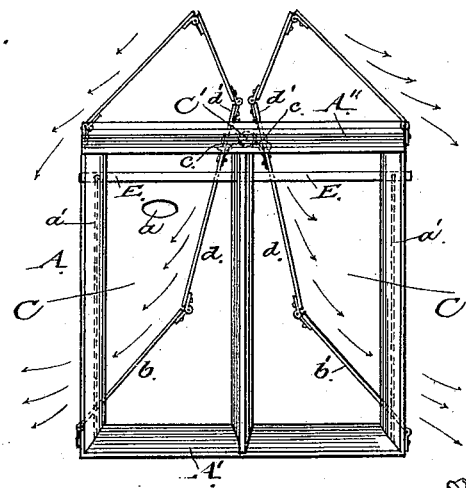
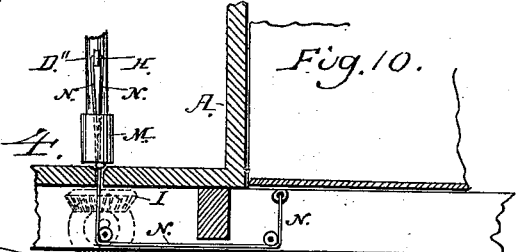
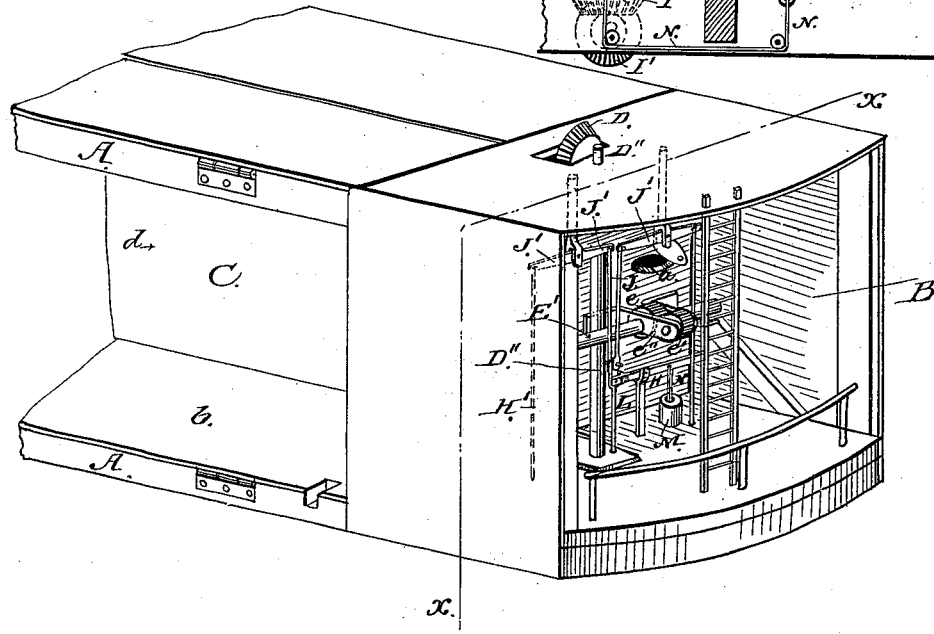
Witnesses
T. W. Fowler
H. B. Applewhite
Inventor
John H. Bennett
By his Attorneys
A. H. Evans & Co.

(No Model.) 3 Sheets—Sheet 3.
J. H. BENNETT.
SNOW PLOW.
No. 354,675. Patented Dec. 21, 1886.
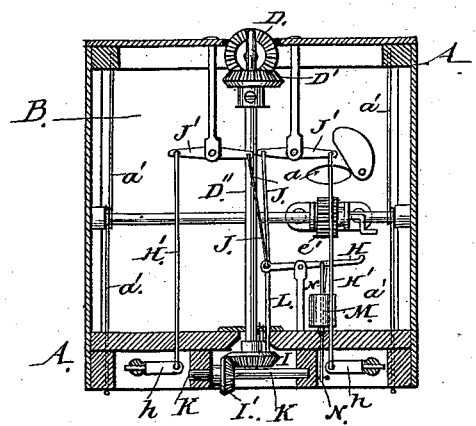
Fig. 5.
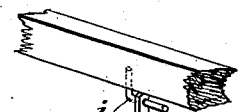
Fig. 8.
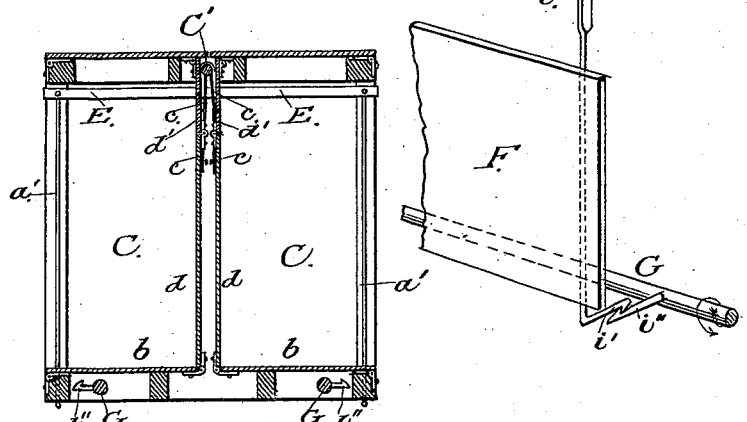
Fig. 6.
Fig. 7.
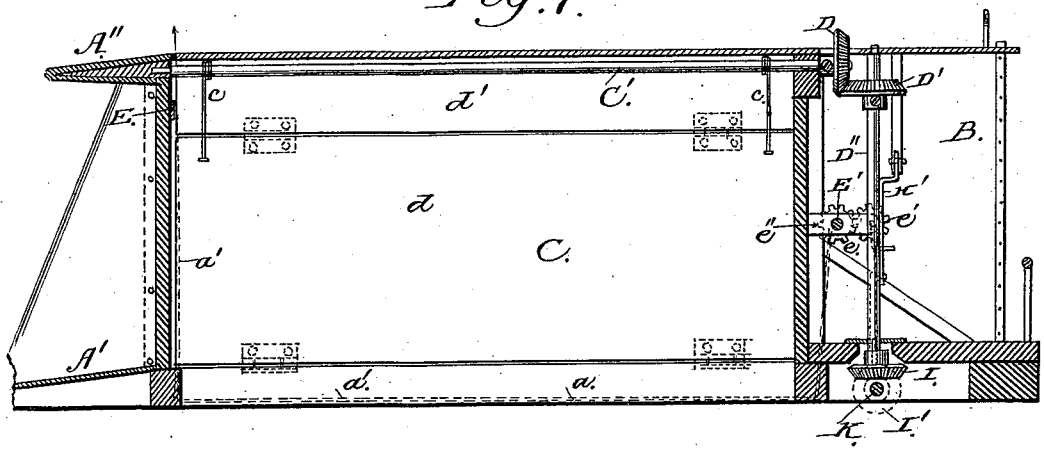
Witnesses
T. W. Fowler
H. B. Applewhaite
Inventor
John H. Bennett
By his Attorneys
N. H. Evans & Co

UNITED STATES PATENT OFFICE.

JOHN H. BENNETT, OF NEW HAMPTON, IOWA.

SNOW-PLOW.

SPECIFICATION forming part of Letters Patent No. 354,675, dated December 21, 1886.

Application filed April 13, 1886. Serial No. 198,729. (No model.)

*To all whom it may concern:*

Be it known that I, JOHN H. BENNETT, a citizen of the United States, residing at New Hampton, in the county of Chickasaw, State of Iowa, have invented a new and useful Improvement in Snow-Plows, of which the following is a full, clear, and exact description, reference being had to the accompanying drawings, forming part of this specification, in which—

Figure 1:
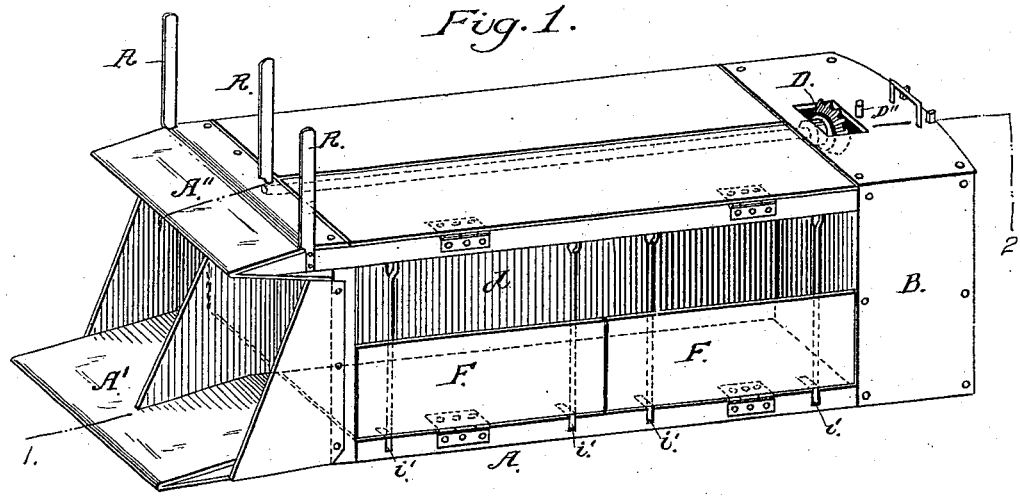
Figure 2:
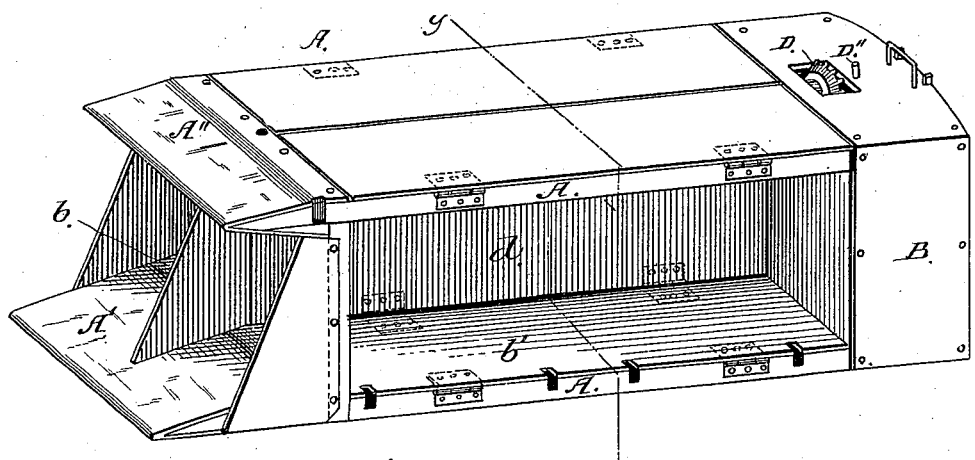
Figure 9:
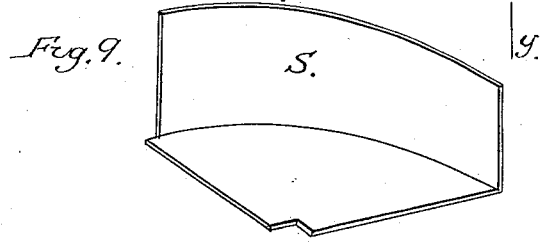

Figure 1 is a perspective view of a snow-plow with my improvements attached for removing light snow and the smaller drifts. Fig. 2 is the same with the boards F removed. Fig. 3 is a front view of the plow in the act of dumping the load. Fig. 4 is a perspective view of the rear of the plow, showing the interior of the operator's room. Fig. 5 is a cross-section through same on the line $x$ $x$. Fig. 6 is a cross-section through the snow-box on the line $y$ $y$ of Fig. 2. Fig. 7 is a longitudinal section through the line 1 2 on Fig. 1; Figs. 8, 9, and 10, details to be referred to.

My present invention relates to that class of snow-plows used to remove snow and snow-drifts from railroad-tracks; and it consists in the several combinations of devices hereinafter explained and claimed.

To enable others skilled in the art to make and use my invention, I will proceed to describe the exact manner in which I have carried it out.

In the drawings, A represents the main frame or body of my improved plow; A' A'', the upper and lower shovels of the plow, and B the operator's room. The small opening or window $a$ in the partition between the snow-box C and the operator's room is to enable the operator to see and regulate the movements of the plow.

The floor of the snow-box is divided into two longitudinal sections, $b$ $b'$, hinged on their outer edges to the frame, and each connected by two longitudinal hinged sections, $d$ $d'$, to corresponding sections in the roof, the roof-sections being also hinged to the frame, as shown in Fig. 6. Longitudinally through the box is placed the shaft C', having suitable bearings in the frame-work of the plow, and carrying on its rear end, which extends into the operator's room, a beveled gear, D, which meshes into a corresponding gear, D', on the vertical shaft D''. To the lower end of the vertical shaft D'' is attached a bevel-gear, I, having a sliding vertical movement on the shaft, whereby it may be readily thrown into or out of gear with the gear I' on the horizontal transverse shaft K, to which the power is applied by any well-known means. To the shaft C' are attached suitable wire cords or chains, $c$ $c$, the ends of which are attached in any convenient manner to the lower vertical sections, $d$.

It is evident from this construction that when the shaft C' is revolved in one direction the cords will be wound up on the shaft, and the hinged sections will all be raised, as shown in Fig. 3, and when the direction of the shaft is reversed the cord will be unwound and the sections will resume their normal condition. The purpose of raising these sections will be hereinafter explained.

Surrounding each side of the frame is a wire cord, $a'$, attached to each end of the cutting-blade E, which has a vertical movement upon the front of the plow-frame between the shovels A' A'', and this cord is connected to the transverse shaft E' in the operator's room. On the shaft E' is rigidly attached a small cog-wheel, $e$, into which meshes a similar cog-wheel, $e'$, having its shaft-bearings in the arms $e''$, and controlled by the operator by means of an ordinary crank.

It is now evident that as the operator turns the crank the shaft E' will be revolved, and by drawing the cord $a$ one way the cutting-blade will be drawn down at the front of the plow, and by reversing the crank the blade will be returned to its normal position at the top of the front opening of the snow-box.

The operation of my plow as far as I have thus described it is as follows: The plow is driven into the snow-drift, into which it cuts its way until snow fills the snow-box, when the operator, by turning the crank and the transverse shaft E, brings down the cutting-blade and severs the load from the drift on the track. The plow is then backed out of the drift, carrying its load of snow, and by the action of the shaft C', as before described, will raise the sections, as shown in Fig. 3, and dump the load at any desired point clear of the track, when the plow is again advanced for another load, the cutting-blade having been again raised to its normal position. I thus produce a plow which will run into a snow-drift of any depth, cut off a load of snow, back out again, and dump it at the point desired. This is the essential feature of my present invention, as it enables me to remove the snow at stations where there is a net-work of side tracks, and where the ordinary snow-plows cannot operate, as they would only throw the snow from one track onto another, while by my improved plow the snow may be readily removed and all the tracks cleaned.

When the snow is not drifted over three or four feet deep, or when it is dry and light, I attach to the sides of the snow-box the dump-boards F by swinging them on hooks $i$ in the upper side timbers of the frame, while the lower portion of the boards are secured by hooks $i'$, passing through the lower side timbers, where the hooks are caught and held by the counter-hooks $i''$, rigidly attached to the longitudinal bars G, placed underneath and on each side of the snow-box and operator's room. When the dump-boards are to be held in place during the loading of the plow and removing the load, they are held by the hooks $i''$, as shown in Fig. 8. When it is desired to dump the load, the dump-boards have to be released at their lower edges. This is readily accomplished by the operator by simply raising up the lever H, which in turn forces up the rods H', and these rods, bearing on the arms $h$, (see Fig. 5,) rigidly secured to the longitudinal bars G, as shown in Fig. 5, cause these bars to partially rotate, so as to throw down the counter-hook $i''$ and release the hook $i'$, thus allowing the dump-boards to swing open to discharge the snow as the sectional floor is raised, as before described. The vertical shaft D'' passes through the floor of the operator's room, and carries at its lower end a vertically-sliding bevel-gear, I, which meshes with a corresponding gear, I', on the transverse horizontal shaft K, having its bearings in the under frame-work beneath the operator's room, as shown in Fig. 5, and to which the power is to be applied, as before stated.

It will be perceived that the brake or lever, by its upward connections J, operates the twin levers J', which in turn operate the connecting-rods H', which connect with and operate the arms or spurs $h$, secured to the longitudinal bars G, as before described. The brake or lever H also enables the operator, by raising it, to bear down the rod L, attached to the loose bevel-gear I, and cause it to engage with corresponding gear, I', on the driving-shaft K. By pressing down the brake H the operator can at pleasure and instantly throw the machinery out of gear. To effect this last object, the brake is rendered automatic by means of a weight, M, attached to a cord, N, which passes through the arm of the brake, thence through the floor of the operator's room, and over a friction-pulley to a point under one of the floor-sections, to which it is attached by an eye or other convenient means. The cord N is just of sufficient length to allow the floor-sections to rise to a predetermined height, when the cord necessarily jerks down the brake-arm and raises the rod L, thus throwing the machinery out of gear with the driving-shaft, when the descending weight will take up the slack in the cord as the flooring of the snow-box returns to its normal position.

When the snow-drift is above the top of the plow. it may be desirable to arrange the vertical knives R above the upper shovel, A'', by placing them in their sockets or otherwise securing them. As the plow passes into the drift these knives will divide and loosen the snow above the plow, much of which may fall upon the top of the plow and be carried out as the plow backs out with its load.

When the snow is light and is only required to be thrown from the track, the mold-boards S (see Fig. 9) are attached by any suitable means to the plow just inside of the forward part of the snow-box, where they perform the duty of the ordinary snow-plow.

Having thus described my invention, what I claim as new, and desire to secure by Letters Patent, is—

1. The frame A, provided with the shovel A', and a floor divided longitudinally and hinged to the frame and to vertical sections $d$, substantially as described.

2. A sectional hinge-floor, in combination with a sectional hinge-top and sectional connections, arranged and constructed to operate substantially as and for the purpose set forth.

3. In a snow-plow, a sectional hinged floor, a sectional hinge-top, and sectional hinge-connections, in combination with a longitudinal shaft, C', cords $c\ c$, bevel-gears D D', and vertical shaft D'', and suitable mechanism for operating the same, substantially as and for the purpose herein set forth.

4. In a snow-plow, a sectional hinged floor, a sectional hinge-top, and sectional hinge-connections, in combination with the cutting-blade E, cords $a$, longitudinal shaft C', cords $c\ c$, bevel-gears D D', and vertical shaft D'', and suitable mechanism for operating the same, substantially as and for the purpose herein set forth.

5. In a snow-plow, a sectional hinged floor, a sectional hinge-top, and sectional hinge-connections, in combination with longitudinal shaft C', cords $c\ c$, bevel-gears D D', vertical shaft D'', bevel-gears I I', and transverse shaft K, all constructed and arranged to operate substantially as and for the purpose herein described.

6. In a snow-plow, a sectional hinged floor, a sectional hinge-top, and sectional hinge-connections, in combination with the dump-boards F, substantially as and for the purpose set forth.

7. In a snow-plow, a sectional hinged floor, in combination with the cord N, weight M, and brake-lever H, and rod L, all constructed and arranged to operate substantially as and for the purpose set forth.

8. The brake-lever H, connections J, and twin levers J', in combination with the rods H', spurs $h$, longitudinal bars G, having hooks $i''$, and the boards F, having hooks $i'$, all constructed to operate substantially as and for the purpose set forth.

9. In a snow-plow, the cutting-blade E and cord $a'$, in combination with the shaft E' and suitable mechanism for operating the same, substantially as and for the purpose herein described.

JOHN H. BENNETT.

Witnesses:
CHARLES McCULLOM,
D. B. HAMAN.